United States Patent [19]

Boes et al.

[11] Patent Number: 4,871,297
[45] Date of Patent: Oct. 3, 1989

[54] REACTOR COOLANT PUMP SEALING SURFACES WITH TITANIUM NITRIDE COATING

[75] Inventors: David J. Boes, Monroeville; Gene Zottola, Pittsburgh, both of Pa.

[73] Assignee: Westinghouse Electric Corp., Pittsburgh, Pa.

[21] Appl. No.: 236,292

[22] Filed: Aug. 24, 1988

Related U.S. Application Data

[63] Continuation of Ser. No. 35,832, Apr. 8, 1987, abandoned.

[51] Int. Cl.$^4$ ............................................. F01D 11/00
[52] U.S. Cl. .................................. 415/170.1; 277/96.2
[58] Field of Search ............. 415/170 R; 277/DIG. 6, 277/96, 96.1, 96.2, 235 A

[56] References Cited

U.S. PATENT DOCUMENTS

| | | | |
|---|---|---|---|
| 2,926,111 | 2/1960 | Schweltzer et al. | 148/6.11 |
| 3,073,717 | 1/1963 | Pyle et al. | 117/69 |
| 3,120,453 | 2/1964 | Fitzer et al. | 117/217 |
| 3,522,948 | 8/1970 | MacCrum | 277/27 |
| 3,529,838 | 9/1970 | Singleton | 277/27 |
| 3,632,117 | 1/1972 | Villasor | 277/3 |
| 3,720,222 | 3/1973 | Andrews et al. | 137/154 |
| 3,964,937 | 6/1976 | Post et al. | 148/6.35 |
| 3,983,303 | 9/1976 | Biermann et al. | 428/457 |
| 4,169,913 | 10/1979 | Kobayashi et al. | 428/217 |
| 4,275,891 | 6/1981 | Boes | 277/96.1 |
| 4,469,801 | 9/1984 | Hirai et al. | 501/96 |
| 4,497,874 | 2/1985 | Hale | 428/551 |
| 4,505,485 | 3/1985 | Hirakawa | 277/DIG. 6 |
| 4,578,087 | 3/1986 | Tanaka et al. | 51/295 |
| 4,693,481 | 9/1987 | Quinn | 277/DIG. 6 |

*Primary Examiner*—Robert E. Garrett
*Assistant Examiner*—John T. Kwon
*Attorney, Agent, or Firm*—J. C. Spadacene

[57] ABSTRACT

A pump has a shaft and a housing containing pressurized fluid and employs a rubbing-type sealing assembly for sealably and rotatably mounting the shaft within the housing. The sealing assembly includes an annular runner mounted around the shaft for rotation therewith and an annular seal ring mounted within the housing in non-rotational relationship thereto. The runner and seal ring have surfaces facing and in rubbing contact with one another. A coating of titanium nitride is incorporated on at least one of the surfaces. The coating of titanium nitride can be deposited as an outer hardface layer on the one surface, or, alternately, as an inner passivating barrier layer upon the one surface and then a coating of chromium carbide can be deposited as an outer hardface layer on the coating of titanium nitride.

11 Claims, 3 Drawing Sheets

REACTOR COOLANT PUMP SEALING SURFACES WITH TITANIUM NITRIDE COATING

This application is a continuation of application Ser. No. 035,832 filed Apr. 8, 1987, now abandoned.

CROSS REFERENCE TO RELATED APPLICATIONS

Reference is hereby made to the following copending applications dealing with related subject matter and assigned to the assignee of the present invention:
1. "Sealing Device for the Drive Shaft of a High Pressure Fluid Pump" by Nicholas Bonhonmee, assigned U.S. Ser. No. 379,196 and filed May 17, 1982.
2. "Nuclear Reactor Coolant Pump Impeller/Shaft Assembly" by Leonard S. Jenkins, assigned U.S. Ser. No. 761,447 and filed May 31, 1985, now issued as U.S. Pat. No. 4,690,612, on Sept. 1, 1987.
3. "Improved Shaft Seal" by Kenneth P. Quinn, assigned U.S. Ser. No. 739,745 and filed May 31, 1985, now issued as U.S. Pat. No. 4,693,481, on Sept. 15, 1987.
4. "Reactor Coolant Pump Hydrostatic Sealing Assembly with Improved Hydraulic Ballance" by Richard P. Guardiani et al., assigned U.S. Ser. No. 063,331 and filed June 17, 1987.

BACKGROUND OF THE INVENTION

1. Field of the Invention

The present invention relates generally to shaft seals and, more particularly, is concerned with the use of a titanium nitride coating as a barrier layer or final coating on shaft seal surfaces in a nuclear reactor coolant pump.

2. Description of the Prior Art

In pressurized water nuclear power plants, a reactor coolant system is used to transport heat from the reactor core to steam generators for the production of steam. The steam is then used to drive a turbine generator. The reactor coolant system includes a plurality of separate cooling loops, each connected to the reactor core and containing a steam generator and a reactor coolant pump.

The reactor coolant pump typically is a vertical, single stage, centrifugal pump designed to move large volumes of reactor coolant at high temperatures and pressures, for example 550 degrees F. and 2500 psi. The pump basically includes three general sections from bottom to top—hydraulic, shaft seal and motor sections. The lower hydraulic section includes an impeller mounted on the lower end of a pump shaft which is operable within the pump casing to pump reactor coolant about the respective loop. The upper motor section includes a motor which is coupled to drive the pump shaft. The middle shaft seal section includes three tandem sealing assemblies—lower primary, middle secondary and upper tertiary sealing assemblies. The sealing assemblies are located concentric to, and near the top end of, the pump shaft and their combined purpose is to provide for zero reactor coolant leakage along the pump shaft to the containment atmosphere during normal operating condition. Representative examples of pump shaft sealing assemblies known in the prior art are the ones disclosed in U.S. Pat. Nos. to MacCrum (3,522,948), Singleton (3,529,838), Villasor (3,632,117), Andrews et al (3,720,222) and Boes (4,275,891) and in the first three patent applications cross-referenced above, all of which are assigned to the same assignee of the present invention.

Historically, the pump shaft seals constitute the main problem area for the reactor coolant pumps and significantly contribute to the utilization factor in nuclear power plants. The seals must be capable of breaking down the high system pressure (about 2500 psi) safely. The tandem arrangement of three seals is used to break down the pressure, with the lower main seal absorbing most of the pressure drop (approximately 2250 psi). The lower primary sealing assembly is the main seal of the pump. It is typically a hydrostatic, "film-riding", controlled leakage seal whose primary components are an annular runner which rotates with the pump shaft and a non-rotating seal ring which remains stationary with the pump housing. Whereas the components of the lower primary sealing assembly are not intended to contact or rub together, corresponding components of the middle and upper sealing assemblies, a rotating runner and non-rotating seal ring, provide contacting or rubbing seals.

Heretofore, the runner components of the rub-type sealing assemblies have been composed of a stainless steel substrate having an outer coating of chromium carbide on the surface of the runner components which rubs against the seal ring. Such coating has proven to be less than satisfactory. Blistering has been observed to occur on chromium carbide coated runners Underlying the present invention is the recognition that blistering has been caused by contact with corrosive materials making up the nuclear water chemistry employed in nuclear reactors, such as chlorine or sulfur bearing compounds. These corrosive materials penetrate through the pores of the chromium carbide coating to the stainless steel/coating interface. Hydrogen gas formation caused by the corrosive mechanism then results eventually in a spalling, or blistering, of the coating's surface.

Consequently, a need exists for an effective way to prevent corrosion of the rubbing surfaces of the reactor coolant pump sealing assembly so as to improve the reliability thereof.

SUMMARY OF THE INVENTION

The present invention provides a reactor coolant pump sealing assembly designed to satisfy the aforementioned needs. The sealing assembly of the present invention has at least one rubbing surface which incorporates a coating of titanium nitride which is highly resistant to the blistering phenomenon observed heretofore on chromium carbide coated seal runners. Titanium nitride coatings, being non-porous, substantially eliminate the problem of blistering. Over two thousand hours of testing have demonstrated their resistance to corrosion in nuclear grade water containing sulfur and chlorine contaminants. In contrast, detonation gun coatings of chromium carbide have blistered severely after only five hundred hours in the same corrosive environment.

The titanium nitride coating can be applied as either the actual wear/corrosion resistant hardface coating, or as a passivating layer deposited on the 304 stainless steel surface prior to its being further treated with detonation gun deposited chromium carbide or other hardface coatings Thus, the coating of titanium nitride can be used as a barrier layer or final coating surface on reactor coolant pump seal inserts and runners of rub-type seals. This coating will supply a wear surface resistant to the carbon graphitar seal ring contacting the runner face surface. In the case of the inserts, the coating provides a wear resistant surface on which a secondary teflon channel seal will ride.

Accordingly, the present invention is set forth in a pump having a shaft and a housing, with the housing containing pressurized fluid. The present invention is directed to a rubbing-type sealing assembly for sealably and rotatably mounting the shaft within the housing. The sealing assembly comprises: (a) an annular runner circumscribing and mounted around the shaft for rotation therewith; (b) an annular seal ring circumscribing and mounted within the housing in non-rotational relationship thereto; (c) the runner and seal ring having surfaces facing and in rubbing contact with one another; and (d) a coating of titanium nitride incorporated on at least one of the surfaces of the seal ring and runner.

More particularly, the coating of titanium nitride is deposited as an outer layer on the one surface. Alternatively, the coating of titanium nitride is deposited as an inner barrier layer upon the one surface and the assembly further comprises a coating of chromium carbide deposited as an outer layer on the coating of titanium nitride. The coating of titanium nitride can be incorporated on either or both surfaces of the seal ring and runner.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
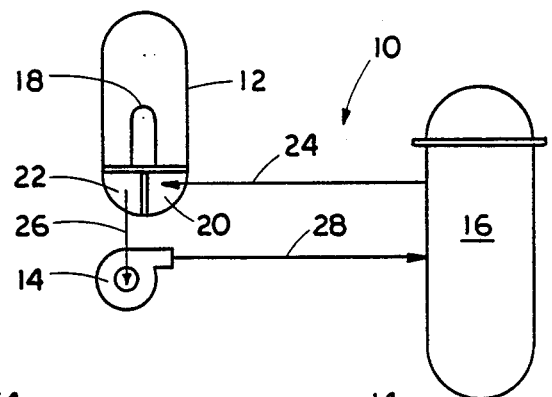
FIG. 1 is a schematic representation of one cooling loop of a conventional nuclear reactor coolant system which includes a steam generator and a reactor coolant pump connected in series in a closed coolant flow circuit with the reactor core.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Referring now to the drawings, and particularly to FIG. 1, there is shown a schematic representation of one of a plurality of cooling loops 10 of a conventional nuclear reactor coolant system. The cooling loop 10 includes a steam generator 12 and a reactor coolant pump 14 serially connected in a closed coolant flow circuit with a nuclear reactor core 16. The steam generator 12 includes primary tubes 18 communicating with inlet and outlet plenums 20,22 of the generator. The inlet plenum 20 of the steam generator 12 is connected in flow communication with the outlet of the reactor core 16 for receiving hot coolant therefrom along flow path 24 of the closed flow circuit The outlet plenum 22 of the steam generator 12 is connected in flow communication with an inlet section side of the reactor coolant pump 14 along flow path 26 of the closed flow circuit. The outlet pressure side of the reactor coolant pump 14 is connected in flow communication with the inlet of the reactor core 16 for feeding cold coolant thereto along flow path 28 of the closed flow circuit.

In brief, the coolant pump 14 pumps the coolant under high pressure about the closed flow circuit. Particularly, hot coolant emanating from the reactor core 16 is conducted to the inlet plenum 20 of the steam generator 12 and to the primary tubes 18 in communication therewith. While in the primary tubes 18, the hot coolant flows in heat exchange relationship with cool feedwater supplied to the steam generator 12 via conventional means (not shown). The feedwater is heated and portions thereof changed to steam for use in driving a turbine generator (not shown). The coolant, whose temperature has been reduced by the heat exchange, is then recirculated to the reactor core 16 via the coolant pump 14.

The reactor coolant pump 14 must be capable of moving large volumes of reactor coolant at high temperatures and pressures about the closed flow circuit. Although, the temperature of the coolant flowing from the steam generator 12 to the pump 14 after heat exchange has been cooled substantially below the temperature of the coolant flowing to the steam generator 12 form the reactor core 16 before heat exchange, its temperature is still relatively high, being typically about 550 degrees F. The coolant pressure produced by the pump is typically about 2500 psi.

Figure 2:
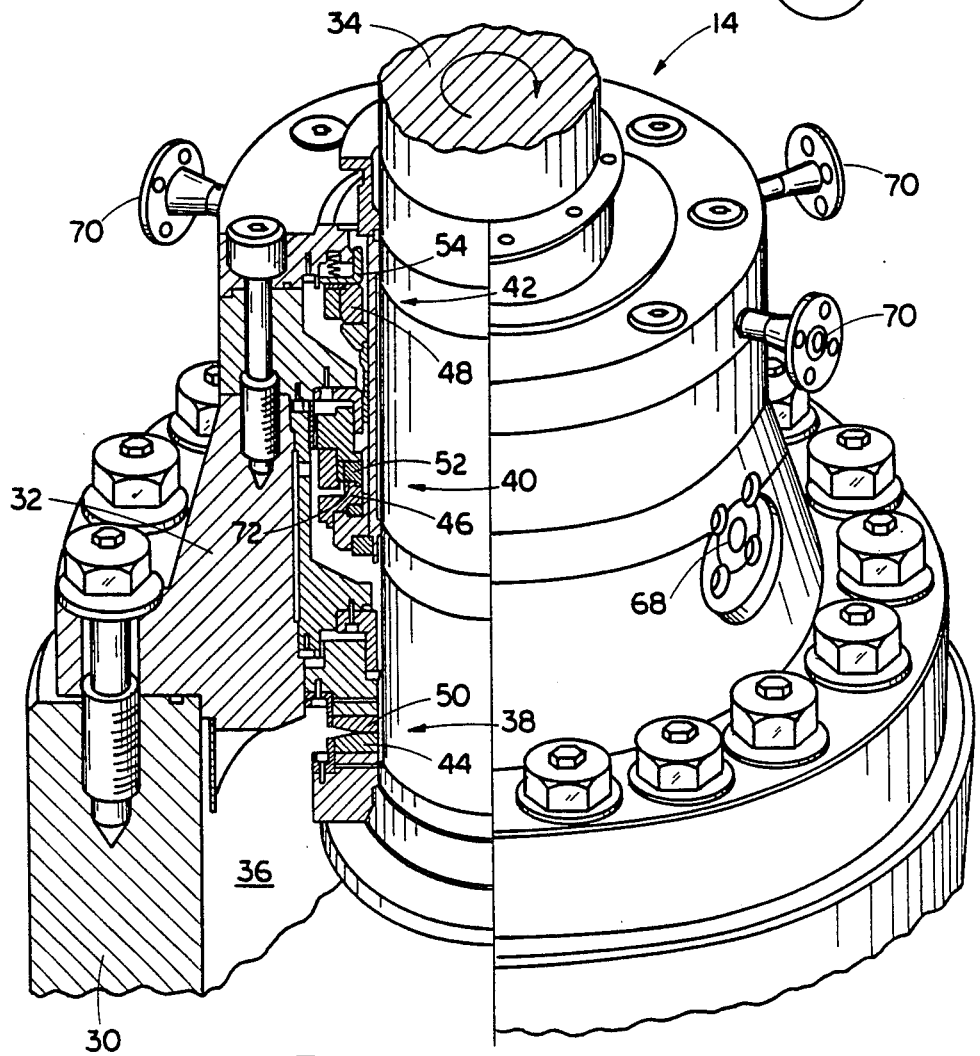
FIG. 2 is a cutaway perspective view of the shaft seal section of a reactor coolant pump, illustrating in cross-section the seal housing and the lower primary, middle secondary and upper tertiary sealing assemblies which are disposed within the seal housing and surround the pump shaft in this section of the pump, with the middle sealing assembly of the pump incorporating the titanium nitride coating in accordance with the principles of the present invention.
Figure 3:
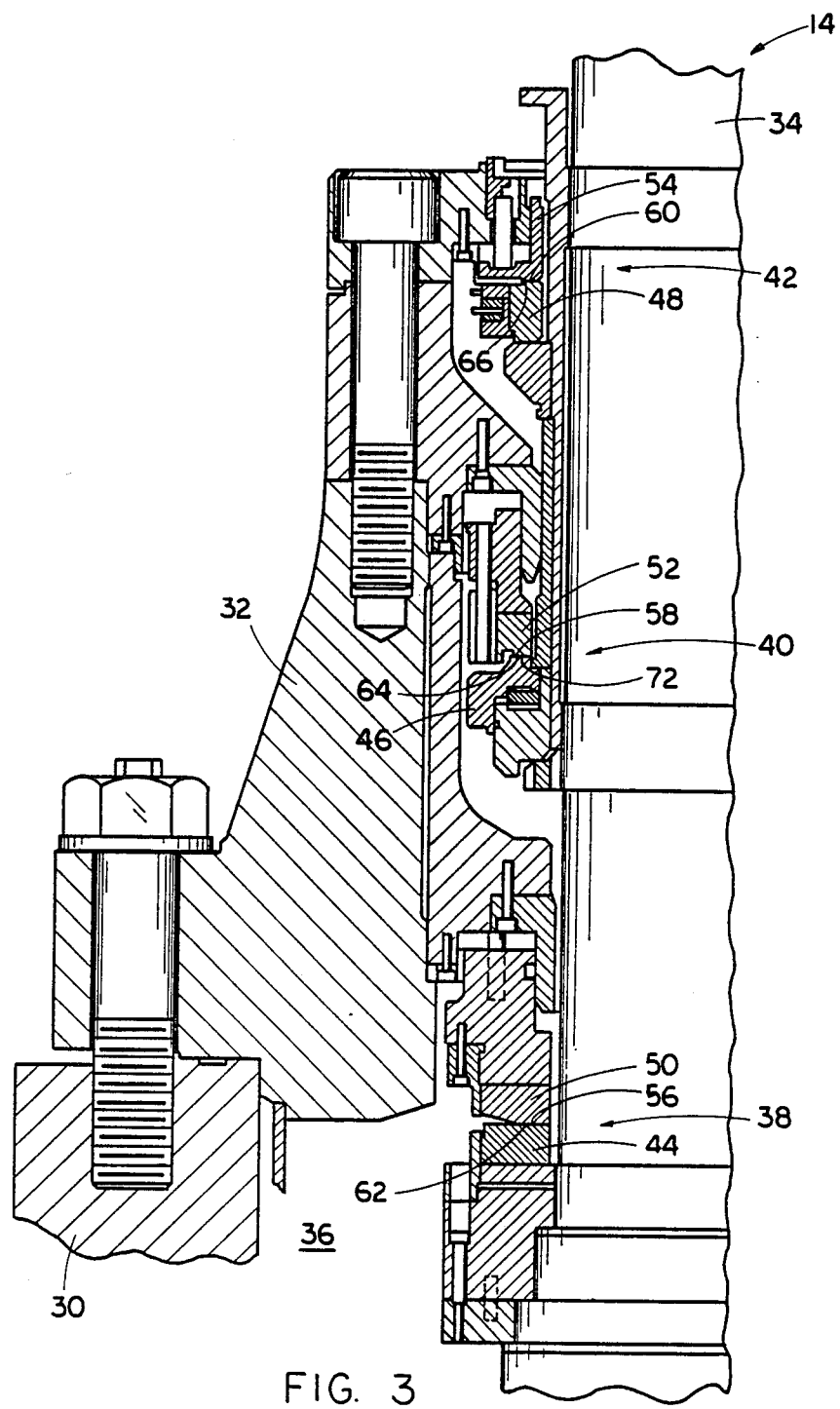
FIG. 3 is an enlarged view of the cross-sectioned seal housing and sealing assemblies of the reactor coolant pump of FIG. 2.
Figure 5:
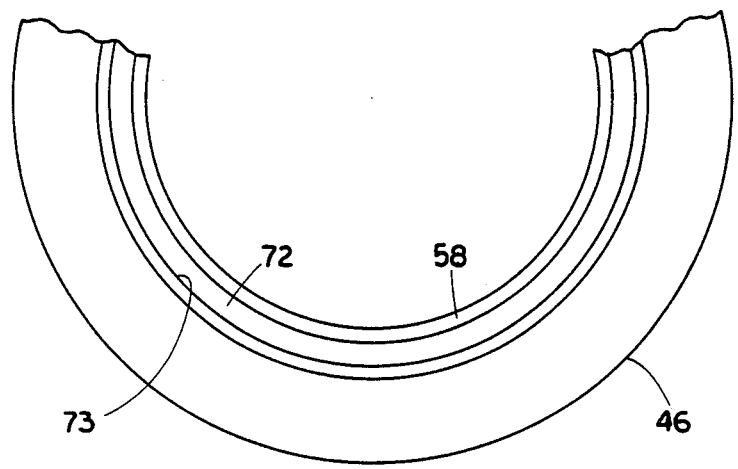
FIG. 5 is a top plan view of the runner as seen along line 5—5 of FIG. 4.
Figure 4:
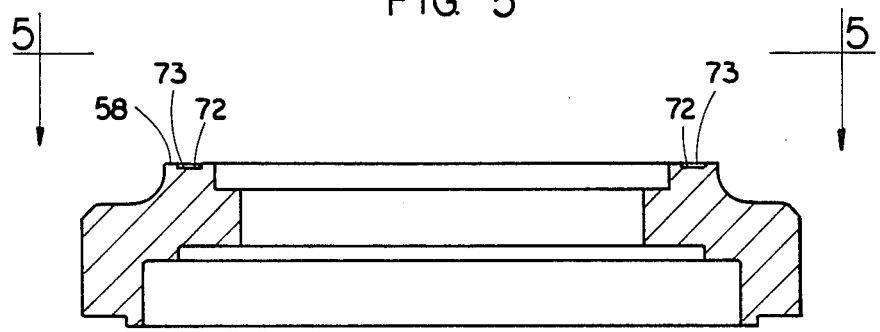
FIG. 4 is an enlarged transverse cross-sectional view of the runner of the middle sealing assembly of the reactor coolant pump of FIG. 3, illustrating the titanium nitride coating deposited as the outer layer on the top end surface of the runner.

As seen in FIGS. 2 and 3, the reactor coolant pump 14 generally includes a pump housing 30 which terminates at one end in a seal housing 32. The pump 14 also includes a pump shaft 34 extending centrally of the housing 30 and being sealingly and rotatably mounted within the seal housing 32. Although not shown, the bottom portion of the pump shaft 34 is connected to an impeller, while a top portion thereof is connected to a high-horsepower, induction-type electric motor. When the motor rotates the shaft 34, the impeller within the interior 36 of the housing 30 circulates the coolant flowing through the pump housing 30 at pressures from ambient to approximately 2500 psi. This pressurized coolant applies an upwardly directed, hydrostatic load upon the shaft 34 since the upper portion of the seal housing 32 is surrounded by the ambient atmosphere.

In order that the pump shaft 34 might rotate freely within the seal housing 32 while maintaining the 2500 psi pressure boundary between the housing interior 36 and the outside of the seal housing 32, tandemly-arranged lower primary, middle secondary and upper tertiary sealing assemblies 38,40,42 are provided in the positions illustrated in FIGS. 2 and 3 about the pump shaft 34 and within the pump housing 30. The lower primary sealing assembly 38 which performs most of the pressure sealing (approximately 2250 psi) is of the non-contacting hydrostatic type, whereas the middle secondary and upper tertiary sealing assemblies 40,42 are of the contacting or rubbing mechanical type.

Each of the sealing assemblies 38,40,42 of the pump 14 generally includes a respective annular runner 44,46,48 which is mounted to the pump shaft 34 for rotation wherewith and a respective annular seal ring 50,52,54 which is stationarily mounted within the seal housing 32. The respective runners 44,46,48 and seal rings 50,52,54 have top and bottom end surfaces 56,58,60 and 62,64,66 which face one another. The facing surfaces 56,62 of the runner 44 and seal ring 50 of the lower primary sealing assembly 38 normally do not contact one another but instead a film of fluid normally flows between them. On the other hand, the facing surfaces 58,64 and 60,66 of the runners and seal rings 46,52 and 48,54 of the middle secondary and upper tertiary sealing assemblies 40 and 42 normally contact or rub against one another.

Because the primary sealing assembly 38 normally operates in a film-riding mode, some provision must be made for handling coolant fluid which "leaks off" in the annular space between the seal housing 32 and the shaft 34 rotatably mounted thereto. Accordingly, the seal housing 32 includes a primary leakoff port 68, whereas leakoff ports 70 accommodate coolant fluid leakoff from secondary and tertiary sealing assemblies 40,42.

The present invention is directed to either one of the rubbing-type secondary or tertiary sealing assemblies 40,42. A coating 72 of titanium nitride, having a thickness within the range of about 0.0002 to 0.0003 inch, is preferably incorporated on at least one of the facing surfaces 58,60 of the respective runners 46,48 of the assemblies 40 and 42. By way of example, in FIGS. 2-5, the coating 72 of titanium nitride is illustrated deposited as an outer hardface layer within a groove 73 formed on the top facing surface 58 of the runner 46 of the middle sealing assembly 40. The coating 72 of titanium nitride provides a low-friction, high-wear surface which can withstand the corrosive compounds in nuclear water chemistry. The substrate material of the runners 46,48 is preferably stainless steel, such as 304, 316 or 410 types. In the preferred embodiment illustrated, the substrate material of the seal rings 52,54 is graphitar-114 and thus would not be coated or treated with titanium nitride. However, in other embodiments, should these seal rings be of stainless steel, such as the runners, then the titanium nitride could be deposited on the bottom facing surface 64 of the seal ring 52 rather than on the top facing surface 58 of runner 46 as illustrated, or, in the alternative, the titanium nitride could be deposited on both the bottom facing surface 64 of seal ring 52 and the top facing surface 58 of runner 46. The titanium nitride coating 72 can be deposited by any suitable method, such as chemical vapor deposition or physical vapor deposition.

Figure 6:
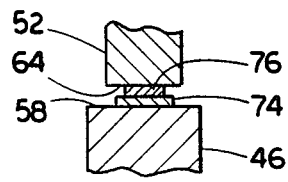
FIG. 6 is an enlarged fragmentary cross-sectional view of the adjacent portions of the seal ring and runner of the middle sealing assembly, illustrating an alternative embodiment wherein the titanium nitride coating is deposited as an inner barrier layer upon a stainless steel runner substrate with the chromium carbide coating then deposited as the outer layer on the inner titanium nitride layer.

Alternately, as illustrated in FIG. 6, the coating 74 of titanium nitride can be deposited as an inner passivating barrier layer upon the top facing surface 58 of the runner 46. Then, a coating 76 of chromium carbide or other hardface material, having a thickness within the range of about 0.006 to 0.008 inch, can be deposited as an outer hardface layer on the coating 74 of titanium nitride. The pair of coatings 74,76 just as equally could have been deposited on the bottom facing surface 64 of the seal ring 52 or on each of the surfaces 64,58 of both the ring 52 and runner 46 if the seal ring 52 was not made of graphitar-114, but rather of stainless steel material like the runner 46. The chromium carbide coating 76 can be deposited by any suitable method, such as detonation gun coating.

The middle or upper sealing assemblies 40,42 of the pump thus has at least one rubbing surface which incorporates the coating of titanium nitride that is highly resistant to the blistering phenomenon observed heretofore on chromium carbide coated seal surfaces. Titanium nitride coatings, being non-porous, substantially eliminate the problem of blistering. Over two thousand hours of testing have demonstrated their resistance to corrosion in nuclear grade water containing sulfur and chlorine contaminants. In contrast, detonation gun coatings of chromium carbide have blistered severely after only five hundred hours in the same corrosive environment.

The titanium nitride coating can be applied as either the actual wear/corrosion resistant hardface coating, or as a passivating layer deposited on the surface of the stainless steel substrate prior to its being further treated with detonation gun deposited chromium carbide or other hardface coatings. Thus, the coating of titanium nitride can be used as a barrier layer or final coating surface on reactor coolant pump seal surfaces of the rubbing-type. This coating when applied on the runner face surface will supply a wear surface resistant to the carbon graphitar seal ring contacting the runner.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

We claim:

1. In a pump having a shaft and a housing containing pressurized fluid, a rubbing-type sealing assembly for sealably and rotatably mounting said shaft within said housing, said sealing assembly comprising:
   (a) an annular runner circumscribing and mounting around said shaft for rotation therewith;
   (b) an annular seal ring circumscribing and mounted within said housing in non-rotational relationship thereto;
   (c) said runner and seal ring having surfaces facing and in rubbing contact with one another; and
   (d) a coating of titanium nitride incorporated on at least one of said surfaces;
   (e) said runner and seal ring surfaces being composed of stainless steel.

2. The sealing assembly as recited in claim 1, wherein said coating of titanium nitride is deposited as an outer layer on said one stainless steel surface and has a thickness within the range of about 0.0002 to 0.0003 inch.

3. The sealing assembly as recited in claim 1, wherein said coating of titanium nitride is deposited as an inner barrier layer upon said one stainless steel surface and has a thickness within the range of about 0.0002 to 0.0003 inch and further comprising a coating of chromium carbide deposited as an outer layer on said coating of titanium nitride and having a thickness within the range of about 0.0006 to 0.0008 inch.

4. The sealing assembly as recited in claim 1, wherein said coating of titanium nitride is incorporated on said surface of said seal ring.

5. The sealing assembly as recited in claim 1, wherein said coating of titanium nitride is incorporated on said surface of said runner.

6. In a pump having a shaft and a housing containing pressurized fluid, a rubbing-type sealing assembly for sealably and rotatably mounting said shaft within said housing, said sealing assembly comprising:
   (a) an annular runner circumscribing and mounted around said shaft for rotation therewith;
   (b) an annular seal ring circumscribing and mounted within said housing in non-rotational relationship thereto;
   (c) said runner and seal ring being composed of stainless steel and having respective surfaces facing and in rubbing contact with one another; and
   (d) a coating of titanium nitride incorporated on said stainless steel surface of at least one of said runner and seal ring, said coating being deposited as an outer hardface layer on said one stainless steel surface and having a thickness within the range of about 0.0002 to 0.0003 inch.

7. The sealing assembly as recited in claim 6, wherein said coating of titanium nitride is incorporated on said surface of said seal ring.

8. The sealing assembly as recited in claim 6, wherein said coating of titanium nitride is incorporated on said surface of said runner.

9. In a pump having a shaft and a housing containing a pressurized fluid, a rubbing-type sealing assembly for sealably and rotatably mounting said shaft within said housing, said sealing assembly comprising:
   (a) annular runner circumscribing and mounted around said shaft for rotation therewith;
   (b) an annular seal ring circumscribing and mounted within said housing in non-rotational relationship thereto;
   (c) said runner and seal ring being composed of stainless steel and having surface facing and in rubbing contact with one another;
   (d) a coating of titanium nitride incorporated on said stainless steel surface of at least one of said runner and seal ring, said coating being deposited as an inner passivating barrier layer upon said stainless steel surface; and
   (e) a coating of chromium carbide deposited as an outer hardface layer on said coating of titanium nitride.

10. The sealing assembly as recited in claim 9, wherein said coating of titanium nitride is incorporated on said surface of said seal ring.

11. The sealing assembly as recited in claim 9, wherein said coating of titanium nitride is incorporated on said surface of said runner.

* * * * *